United States Patent [19]

Cox

[11] Patent Number: 4,635,583
[45] Date of Patent: Jan. 13, 1987

[54] TIRE SKID DETECTOR

[76] Inventor: Geral L. Cox, 8931 Upper DeArmoun Rd., Anchorage, Ak. 99516

[21] Appl. No.: 808,520

[22] Filed: Dec. 13, 1985

[51] Int. Cl.$^4$ .............................................. B60Q 9/00
[52] U.S. Cl. ................................. 116/28 R; 411/166; 411/907; 411/908; 350/99; 116/56
[58] Field of Search ............... 116/28 R, 56; 152/151, 152/154.1, 154.2, 450; 301/38 R, 108 R, 108 A; 350/97, 99; 305/4; 411/107, 166, 907, 908; 40/17, 18, 587; 52/716, 823

[56] References Cited

U.S. PATENT DOCUMENTS

| | | | |
|---|---|---|---|
| 1,896,695 | 2/1933 | Borovicka | 40/17 |
| 2,000,212 | 5/1935 | Bradley | 52/823 |
| 2,191,388 | 2/1940 | Hicks | 350/99 |
| 3,478,713 | 11/1969 | Brames | 116/56 |
| 3,585,962 | 6/1971 | Vartia | 116/28 R |
| 3,707,308 | 12/1972 | Smith | 301/38 R |
| 4,046,098 | 9/1977 | Mancinelli et al. | 116/56 |
| 4,194,810 | 3/1980 | Eller | 350/99 |
| 4,246,691 | 1/1981 | Ulmer | 301/44 T |
| 4,422,276 | 12/1983 | Paravano | 411/107 |

Primary Examiner—Charles Frankfort
Assistant Examiner—Willie Morris Worth
Attorney, Agent, or Firm—Burns, Doane, Swecker & Mathis

[57] ABSTRACT

A skid detector is mountable for rotation with a vehicle wheel to enable a driver of the vehicle, especially a tractor trailer, to observe a condition wherein the tire is skidding. The detector comprises a strip mountable to a hub of the vehicle and includes a pair of legs projecting outwardly beyond the plane of the tire side wall so as to be observable when the tire is viewed in a direction transversely of the rotary axis thereof. The legs carry a light reflecting substance so as to be visible at night. A fastener is provided which enables the strip to be mounted in a central hole of the vehicle hub. The legs are configured so as to be deformed in response to engagement with an annular wall of the wheel so as to assume a condition parallel to the rotary axis of the wheel.

15 Claims, 9 Drawing Figures

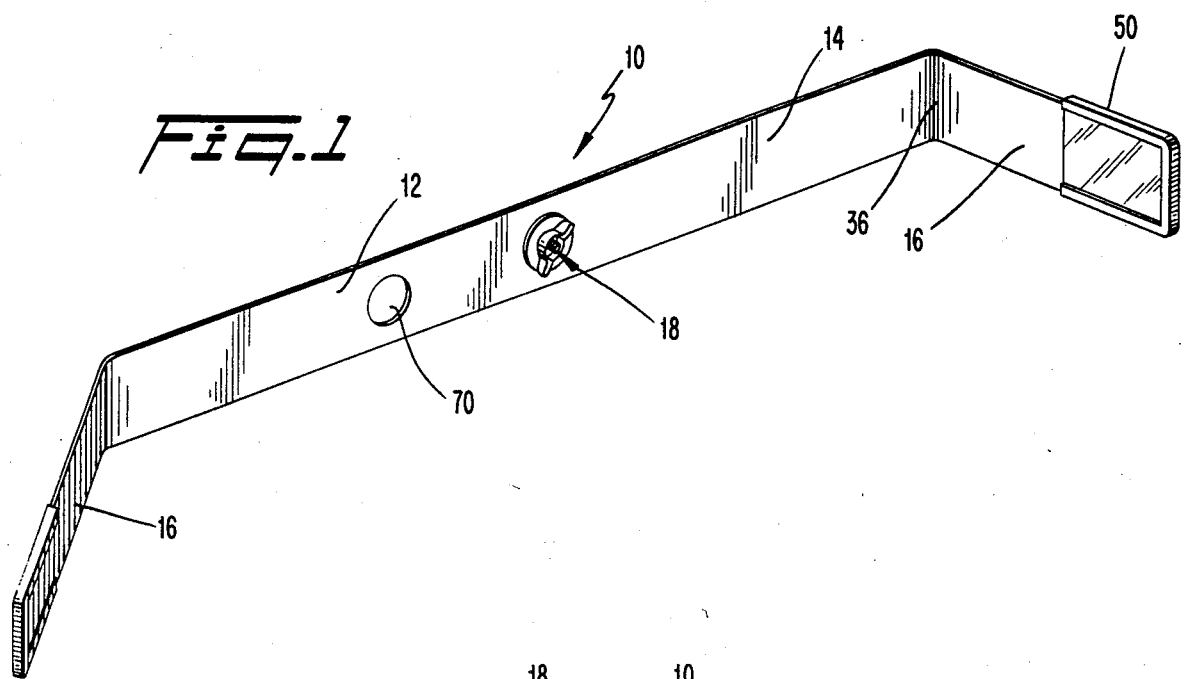
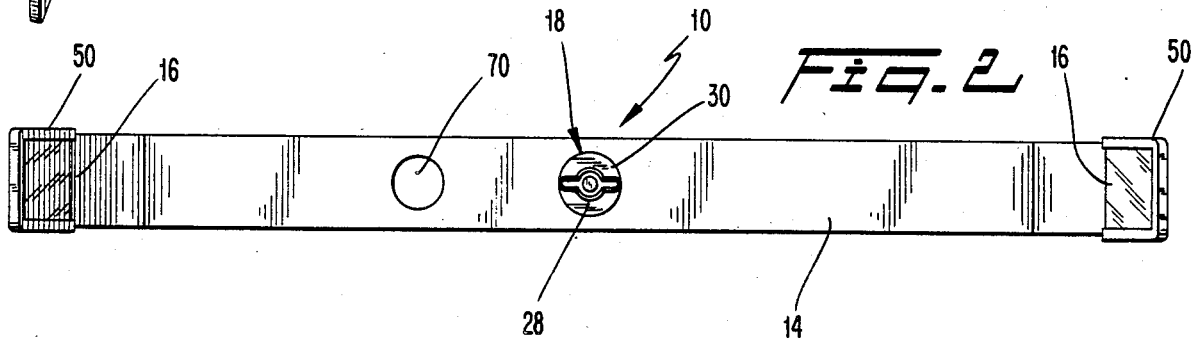
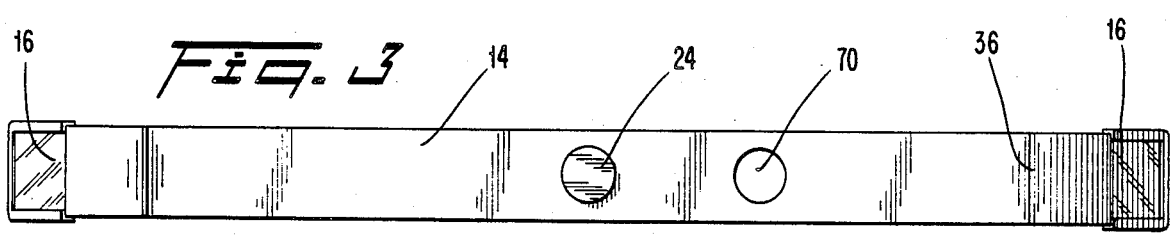
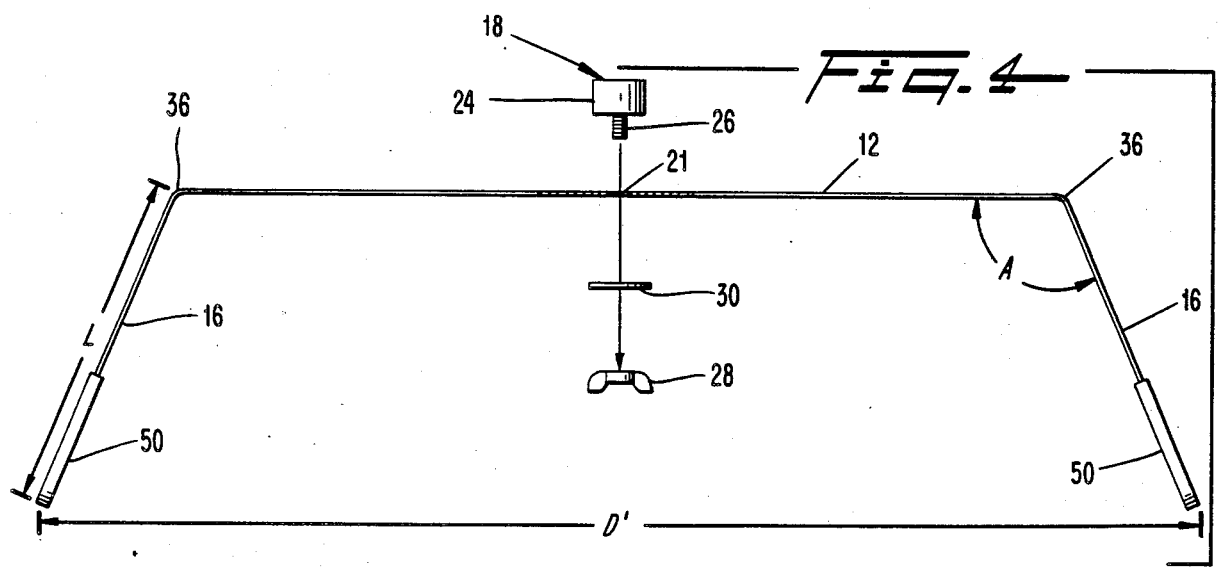

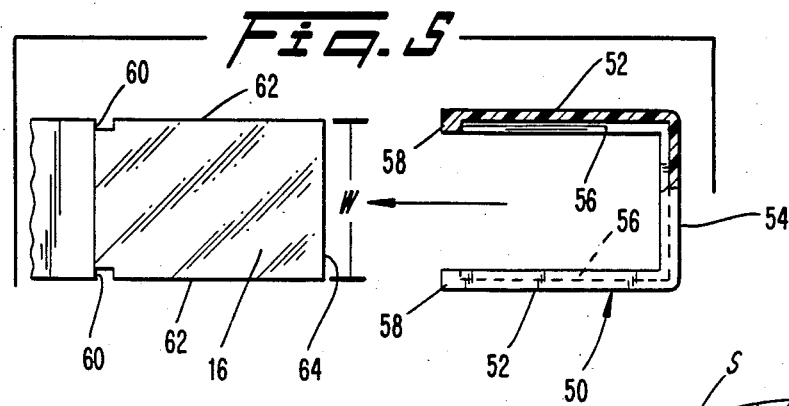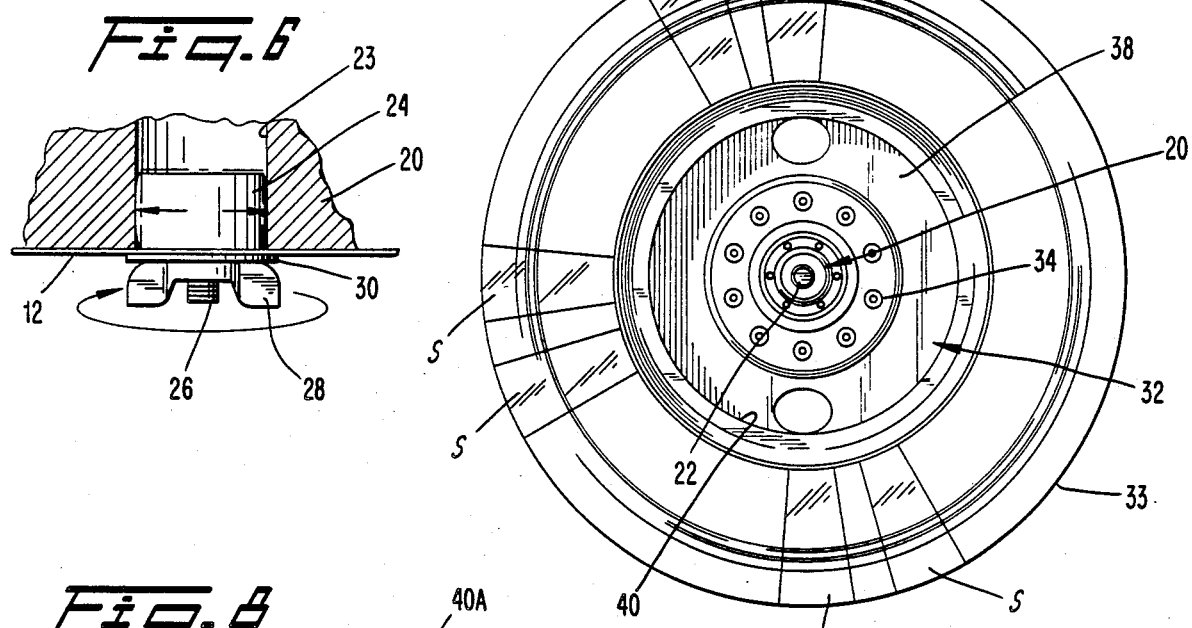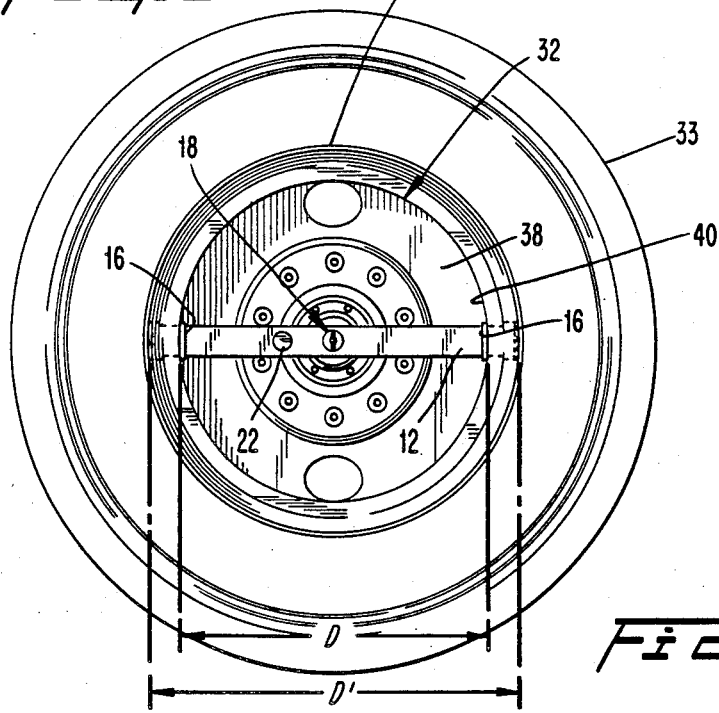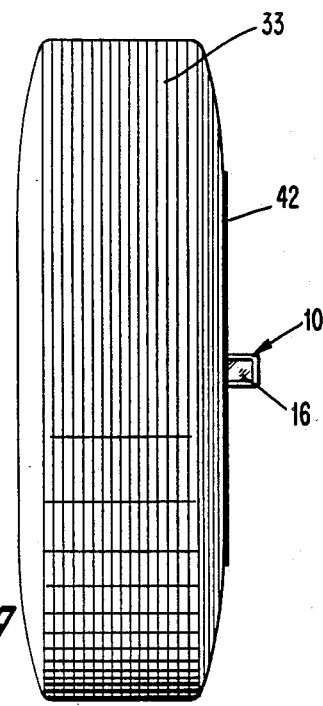

TIRE SKID DETECTOR

BACKGROUND AND OBJECTS OF THE INVENTION

The present invention relates to a safety device for use on the wheels of a vehicle such as a truck trailer, to enable the driver to observe when one or more of the wheels are skidding.

During the operation of large vehicles such as trailer trucks wherein the wheels of the trailer are out of the view of the driver, it may occur, under certain conditions such as wheel bearing freeze-up, over-application of brakes, malfunction of brakes for example, that the rotation of the wheels is prevented, or hindered, whereupon the tires proceed to skid relative to the ground surface. Such an occurrence is potentially dangerous because it may lead to tire blow-outs and/or complete destruction of the tires. Since the wheels and tires are not conveniently visible to the driver, the skidding can easily go undetected until a blow-out occurs. This problem is particularly evident in colder climates where truck brakes can freeze rather rapidly when the truck is at rest.

A previous proposal for dealing with this problem involves the application of painted-on stripes 5 (see FIG. 7) to the tire side wall in an attempt to make it easier for the driver to detect when the tire is not rotating properly. However, such stripes or strips are not readily visible to the driver, especially in the case of tandem trailers, and thus do not significantly enhance the driver's ability to detect a skidding condition.

It is, therefore, an object of the present invention to minimize or obviate problems of the type discussed above.

Another object is to provide a wheel skid detector which is readily visible to a vehicle driver during day and night conditions.

An additional object is to provide such a detector which is economical to make, easy to attach and remove, and does not contribute to wheel imbalance to an appreciable extent.

SUMMARY OF THE INVENTION

These objects are achieved by the present invention which relates to a tire skid detector adapted to be mounted for rotation with a wheel and tire carried thereby in order to enable a driver of a vehicle to detect a condition wherein the tire is skidding. The detector comprises a strip having a mounting portion and a leg projecting outwardly from an end of the mounting portion and carrying light reflecting means. The leg projects outwardly beyond the plane of the tire side wall so as to be observable when the tire is viewed in a direction transversely of the rotary axis thereof. The leg is located radially inwardly of the outer circumference of the tire so as to avoid making contact with a road surface.

Preferably, the strip includes two legs which are formed by bending the opposite ends of the strip.

The mounting portion is disposed within a recess of the wheel such that the leg is contacted and are deflected by an annular wall of the recess so as to be securely held against the wheel.

Preferably, the mounting portion is fastened to the hub of a vehicle by means of a fastener which comprises an elastic plug insertable into a hole of the hub, a threaded pin extending outwardly from the plug and through an opening in the strip, and a nut threadedly mounted on the pin to secure the strip.

A guard formed of elastic material can be mounted on the legs to blunt the edges thereof.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a perspective view of a skid detector according to the present invention;

FIG. 2 is a front elevational view of the skid detector;

FIG. 3 is a rear elevational view of the skid detector;

FIG. 4 is a plan view of the skid detector, containing an exploded view of a fastener for mounting the skid detector;

FIG. 5 is an exploded view of a leg portion of the skid detector and a removable edge guard therefor;

FIG. 6 is an enlarged, fragmentary view of the fastener which fastens the skid detector to a vehicle hub;

FIG. 7 is a side elevational view of a conventional wheel mounted on a vehicle hub;

FIG. 8 is a side elevational view of the wheel depicted in FIG. 7, with the skid detector of the present invention mounted thereon; and FIG. 9 is an end elevational view of the wheel depicted in FIG. 8, depicting the manner in which the leg portion of the skid detector is visible when the tire is viewed in a direction perpendicularly to its axis of rotation.

DETAILED DESCRIPTION OF A PREFERRED EMBODIMENT OF THE INVENTION

A skid detector 10 according to the present invention comprises an elongate strip 12 which is bent outwardly adjacent both outer ends to form a generally U-shaped member having a central mounting portion 14 and a pair of outwardly projecting legs 16. The center portion of the strip is basically flat and constitutes a mounting portion in that it includes a central opening 21 adapting the strip to be mounted by means of a fastener 18.

In that regard, most truck trailer hubs 20 (FIG. 7) comprises a central hole 23 (of about 1-½inch dia.)(FIG. 6) for enabling the wheel bearing to be inspected and lubricated. That hub hole normally contains a rubber plug 22 (FIG. 7) which is frictionally retained within the hub hole to sealout foreign matter.

The strip 12 preferably utilizes that hub hole for mounting purposes. That is, the hub hole 21 is adapted to receive the fastener 18 which comprises an elastic plug 24 (FIGS. 4, 6) formed of rubber or plastic, for example, having an externally threaded pin 26 projecting therethrough. The plug 24 is sized to be frictionally held within the hub hole, with the pin 26 projecting through the opening 21 in the strip. A wing nut 28 is threadingly fastened to the exposed end of the pin 26 and bears against a washer 30 to secure the strip 12 against dislodgement from the pin. When the nut is tightened, the plug 24 is expanded so as to be retained against dislodgement from the hub hole. If desired, a cotter pin (not shown) can be inserted through aligned bores in the nut and pin to prevent loosening of the nut.

The distance between the bend lines 36 of the strip is preferably chosen to correspond to a diameter D of a recess defined by an annular wall 38 of the wheel 32, so that when the strip 12 is installed, the legs 16, as they are moved inwardly into the recess 38, will abut an annular wall 40 of the recess and become deformed to an orientation perpendicular relative to the mounting portion 14 of the strip, i.e., parallel to the rotary axis of the wheel. (The legs 16 are shown in an undeformed condition in broken lines in FIG. 8 having an outer diameter D' (see also FIG. 4) before being deformed during installation.) The deformed legs 16 will, of course, tend to spring toward their undeformed state so as to be snugly held against the wall 40 to further assure that the strip 12 rotates in unison with the wheel 32 and tire 33. It will thus be appreciated that the legs are disposed radially inwardly of a radially outermost peripheral edge 40A of the wheel.

Preferably, the strip 12 is formed of a somewhat resiliently flexible material such as aluminum to permit the deforming of the legs 16.

The length L of each leg 16 is sufficient to assure that when the strip has been installed, at least the outer end of the leg 16 (preferably about two inches) projects beyond the plane of the side wall 42 of the tire (see FIG. 9). As a result, the legs will be visible to the driver via the side view mirrors, i.e., visible in a direction extending transversely relative to the axis of rotation of the tire, making it possible for the driver to more readily detect a condition wherein the tire is skidding. That is, if a condition occurs which obstructs proper rotation of the wheel, such as bearing freeze-up, excessive brake application, and/or brake malfunction for example, the wheel may cease to rotate or may rotate at an excessively slow rate. Such a condition can be detected by the driver since the slow rate of movement or lack of movement of the legs will be representative of tire speed. Moreover, the driver will be able to view the legs associated with all of the tires, whereby a differential rate of movement of one of the legs will be readily apparent.

In order to facilitate the detection of skidding when driving in the dark, the legs are provided on both sides with a reflective material such as conventional reflective adhesive strips or reflective paint, for example. Those legs will thus be reflective of light such as from the headlights of other traffic and/or the rearwardly directed lights provided on most trucks to facilitate backing-up at night, whereby the legs will be particularly visible even at night.

In order to blunt the edges of the legs, guards 50 can be mounted thereon (see FIG. 5). The guards 50 comprise U-shaped snap-on members having a pair of parallel fingers 52 interconnected by a bight 54. The fingers 52 contain slots 56 spaced apart by a distance corresponding to the width W of the leg so that the guard 50 can be slid thereover. The ends of the fingers can be provided with inward projections 58 which snap into cooperating notches 60 in the side edges 62 of the leg. The fingers and bight thus envelop the side edges and end edge 64 of the leg to render them less sharp. The guard is preferably formed of a material which is softer than the strip, e.g., of plastic or rubber.

When the strip 12 is mounted on a hub having a central hub hole covered by the rubber plug 22, that plug 22 is removed. In order to prevent the plug 22 from being lost, it can be pressed into an aperture 70 formed in the mounting portion 14 of the strip 12. Thus, the plug will always be available for re-use.

Preferably, the legs 16 should be of sufficient width to be readily visible. In that regard, the legs should be greater than one inch in width; a width of two inches has been found to perform successfully.

IN USE, the strip 12 is mounted to the hub 20, preferably by removing the center plug 22 from the hub and inserting therein the plug 24 of the fastener 18. The strip opening 21 is inserted onto the threaded pin 26, and the nut 28 is secured to the end of the pin. During that operation, the outer legs 16 of the strips 12 will each be deformed to a right-angle orientation in response to contact with the wall 40 of the wheel 32. The outer ends of the legs, e.g., about two inches, will extend beyond the tire side wall.

As a truck travels along the highway, the exposed ends of the legs 16 will be visible to the driver via the side view mirrors. In the event that the tires begin to skid, e.g., if the wheel bearings freeze or the wheel brakes are applied too heavily on a downgrade, the skidding condition will be readily visible to the driver by viewing the legs 16 in the side view mirrors. Since the legs 16 are light reflective, they will be visible even at night. If no oncoming or trailing traffic is present to provide light for reflective purposes, the driver can turn on the rearwardly directed lights on the truck which are conventionally provided in order to enable the truck to back-up safely. Those lights will be reflected by the reflective legs 16, rendering the legs highly discernable.

Additional advantages of the reflective legs are that they will advise other vehicles of the truck's presence at night in the event, for example, that the truck's lights fail or the truck is stopped on the side of the road but no flares or other warning devices have been set-out.

Because legs are provided at both ends of the strip, i.e., since the strip is symmetrical, there is no chance for the strip to unbalance the wheels to any appreciable extent.

It will be appreciated that it is necessary to mount the strip 12 for unitary rotation with the wheel and tire. The fastening mechanism disclosed above has been found to be highly effective and simple, but it will be appreciated that other mounting arrangements may become apparent to those skilled in the art and are deemed to be within the purview of the present invention.

Although the present invention has been described in connection with a preferred embodiment thereof, it will be appreciated by those skilled in the art that additions, modifications, substitutions, and deletions not specifically described, may be made, without departing from the spirit and scope of the invention as defined in the appended claims.

What I claim is:

1. A tire rotation detector in combination with a vehicle wheel carrying a tire, said wheel defining a rotary axis and including a radially outermost peripheral edge and a center hub with a central hole therein, said detector comprising a strip including a diametrically extending mounting portion having a pair of legs disposed diametrically apart at opposite ends of said mounting portion, said legs disposed radially inwardly of said peripheral edge and projecting axially outwardly beyond a plane defined by a side wall of the tire and carrying light reflecting means so as to be observable when the detector is viewed in a direction transversely of said rotary axis of said wheel, and releasable fastener means for removably attaching said mounting portion to said central hole.

2. A combination according to claim 1, wherein said strip is bent at both its ends to form said legs.

3. A combination according to claim 1, wherein said light reflecting means is disposed on both sides of each said leg.

4. A combination according to claim 1, wherein each said leg includes side edges interconnected by an end edge, an edge guard mounted on said leg in overlying relationship to said side and end edges.

5. A combination according to claim 4, wherein said edge guard is U-shaped and comprises a pair of parallel fingers interconnected by a bight, said fingers each including a slot for receiving one of said side edges, said fingers each including an inward projection, and said side edges each including a notch for receiving one of said projectins to secure said guard to said leg.

6. a combination according to claim 1, wherein said fastener means comprises a radially expandable member connected to said strip and sized to be insertable into said hole when in a radially relaxed position, and means for expanding said member radially outwardly to secure said member to a wall of said hole.

7. A combination according to claim 6, wherein said radially expandable member comprises an elastic plug, said means for radially expanding said plug comprising a threaded pin extending axially outwardly from within said plug for passing through an opening in said strip, and a nut threadedly mounted on said pin for axially compressing said plug.

8. A combination according to claim 6, wherein said mounting portion includes an aperture sized to receive a plug which is normally installed in said hole, when said detector is removed from said wheel.

9. A combination according to claim 1, wherein said wheel includes a recess having a radially inwardly facing annular wall, said legs tending to diverge outwardly in a relaxed state and being engageable with said annular wall to be deformed radially inwardly by said annular wall to a position oriented parallel with said rotary axis and biased into frictional engagement with said annular wall.

10. A combination according to claim 9, wherein said fastener means comprises an elastic plug sized to be inserted into said hole, and means for axially compressing and radially expanding said plug into frictional engagement with a wall of said hole.

11. A tire rotation detector adapted to be mounted for rotation with a tire-carrying wheel of the type having a radially outermost peripheral edge and a central hub which defines a rotary axis and a central hole therein, said detector comprising a strip having a diametrically extending mounting portion and a pair of legs projecting axially outwardly from opposite ends of said mounting portion and adapted to be disposed radially inwardly of the peripheral edge and project axially outwardly beyond a plane defined by a side wall of the tire so as to be observable when the detector is viewed in a direction transversely of the rotary axis of said wheel, each of said legs carrying light reflecting means on opposite sides thereof, and releasable fastener means connectable to a midpoint of said mounting portion and sized to enter said hole in said wheel for removably attaching said strip to said hole.

12. A tire rotation detector according to claim 11, wherein said wheel is of the type including a recess with an annular wall, said legs tending to diverge outwardly from said mounting portion in a relaxed state, said legs being bendable to a generally parallel relationship in response to engagement with said annular wall of said wheel so as to frictionally bear in a radial direction against said annular wall.

13. A tire rotation detector according to claim 11, wherein said fastener means comprises a radially expandable member connected to said strip and sized to be insertable into said hole when in a radially inward position, and means for expanding said member to a radially outward position to secure said member to a wall of said hole.

14. A tire rotation detector according to claim 11, wherein said radially expandable member comprises an elastic plug, said means for radially expanding said plug comprising a threaded pin extending axially outwardly from within said plug for passing through an opening in said strip, and a nut threadedly mounted on said pin for axially compressing said plug.

15. A tire rotation detector according to claim 11, wherein said mounting portion includes an aperture sized to receive a plug, which is normally installed in said hole, when said detector is removed from said wheel.

* * * * *